United States Patent [19]
Shimada

[11] 3,807,535
[45] Apr. 30, 1974

[54] BRAKE ADJUSTING DEVICE
[75] Inventor: Karo Shimada, Tokyo, Japan
[73] Assignee: Tokyo Buhin Kogyo Co., Ltd., Kanagawa, Japan
[22] Filed: Aug. 21, 1972
[21] Appl. No.: 282,061

[52] U.S. Cl. ............ 188/79.5 K, 188/70 R, 188/325
[51] Int. Cl. ............................................. F16d 65/56
[58] Field of Search ............ 188/70 R, 78, 79.5 GE, 188/79.5 K, 325, 332, 367, 368, 369

[56] References Cited
UNITED STATES PATENTS
| | | | |
|---|---|---|---|
| 1,992,226 | 2/1935 | McConkey | 188/78 |
| 2,109,722 | 3/1938 | Fawick | 188/369 X |
| 1,661,191 | 3/1928 | Midboe | 188/79.5 K |
| 3,294,203 | 12/1966 | Wier | 188/332 X |

Primary Examiner—Duane A. Reger

[57] ABSTRACT

The brake actuating device according to the present invention has a worm gear engaged with a worm wheel mounted on a screw rod for actuating the brake shoes, a ratchet wheel rotatable together with said worm gear, a ratchet arm engaged with wheel and actuated by the spring to rotate the ratchet wheel, so that when the brake shoes are worn, the increased clearance between the shoe and a brake drum can be automatically adjusted by the contacting action of the ratchet arm with the stationary portion.

1 Claim, 7 Drawing Figures

BRAKE ADJUSTING DEVICE

The present invention relates to a brake device and more particularly to a brake device having a novel mechanism for adjusting automatically the clearance between a brake shoe and a brake drum.

The present invention has a primary object to provide a brake device which is simple in construction and light in weight.

Another object of the present invention is to provide a brake device which has a novel brake clearance adjusting mechanism.

A further object is to provide a brake actuating device which will automatically compensate for wear in the brake linings by rotating a worm wheel so that a threaded shaft attached to the wheel will push a pair of nuts outwardly toward the brake shoes.

The above and other objects and features of the present invention will become apparent from the following descriptions of preferred embodiments shown by way of example in the accompanying drawings, in which.

Figure 1:
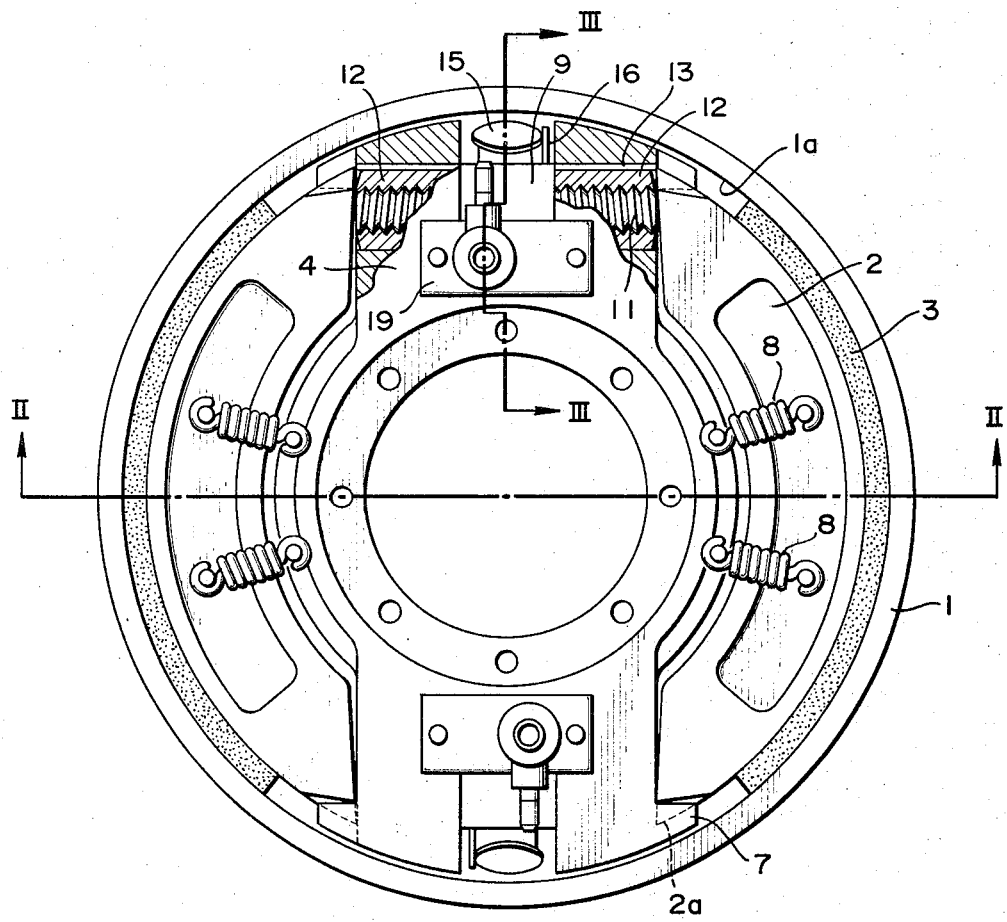
FIG. 1 is a front view of a brake device embodying the present invention.
Figure 2:
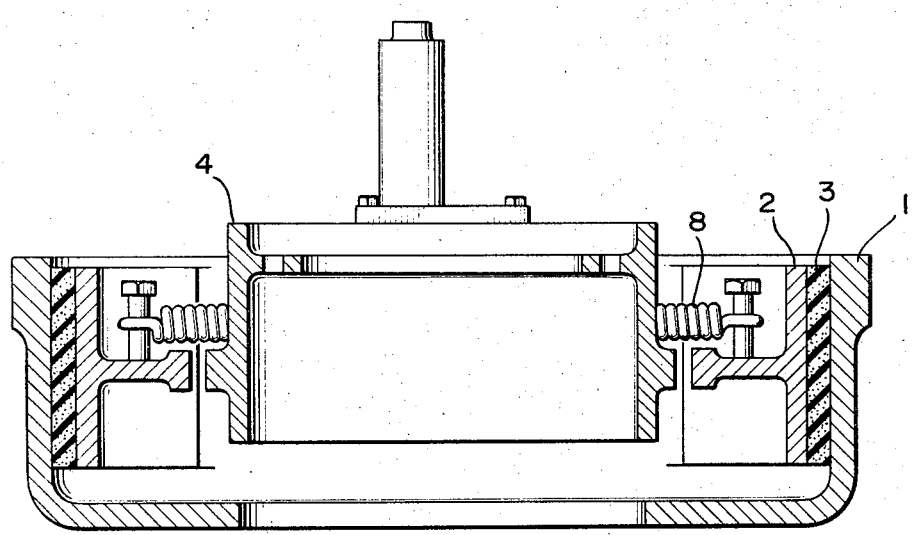
FIG. 2 is a sectional view taken along the line II—II of FIG. 1.

Referring to the drawings, particularly to FIGS. 1 through 6, there is shown an embodiment of the present invention which includes a brake drum (1) having an annular frictional surface (1a). Within the brake drum (1), there is disposed a pair of brake shoes (2), each of which has an arcuate brake lining (3) facing to the friction surface (1a) of the brake drum (1). Although not shown in the drawing, the brake drum (1) is connected to a wheel of a vehicle and rotates therewith. Within the brake drum (1), there is also disposed a stationary member in the form of a bracket (4) which has a pair of support arms (5) at the diametrically opposite portions thereof, the upper one being shown in FIG. 6. Each of the arms (5) has a radially directed rectangular cutout (6) and a pair of bifurcated flanges (7) extending circumferentially outwardly of the bracket. The brake shoe (2) has a projection (2a) on each of its ends and supported by engaging each projection (2a) with each one of the bifurcated flanges (7) of the bracket. Thus, the brake shoe (2) is movable in the radial direction of the brake drum (1) but restricted from movement in the axial direction. Each brake shoe (2) is biased radially inwardly apart from the friction surface (1a) of the brake drum (1) by means of a pair of springs (8).

An automatic clearance adjusting mechanism according to the present invention is as described hereinafter.

In each of the cutouts (6) of the stationary bracket (4), there is disposed a block (9) in which a worm wheel (10) is arranged. The worm wheel (10) has an internally splined axial hole (10a). A screw rod (11) having screw threads (11a) of opposite directions at the opposite ends and an axial spline (11b) at the center portion thereof. The screw rod (11) passes through the block (9) and the worm wheel (10) as well as the support arm (5) in the circumferential direction of the bracket (4) as shown in FIG. 1 with the spline (11b) engaging with the internal spline (10a) of the worm wheel (10). The block (9) is formed with a worm housing (9a) in which a worm (14) is disposed. The worm (14) is in meshing engagement with the worm wheel (10) and has a ratchet wheel (15) secured thereto by a shaft (24). In this arrangement, when the block (9) is rotated about the axis of the screw rod (11), the rotation is transmitted through the worm (14) and the worm wheel (10) to the screw rod (11). A nut is engaged with each thread (11a) of the screw rod (11) and axially slidably but non-rotatably supported on the arm (5) of the bracket (4) by means of a key (13). Further, each nut (12) is in abutting engagement with the adjacent portion of the brake shoe (2). Thus, when the screw rod (11) is rotated by the block (9), the nut (12) is axially shifted to move the corresponding brake shoe (2) into engagement with the brake drum (1).

A ratchet arm (16) is pivotably supported at its intermediate portion on the outer side surface of the worm housing (9a) and has an end (16a) adapted to engage with the ratchet wheel (15). The other end (16b) of the arm (16) is disposed adjacent to the bottom (6a) of the cutout (6) (i.e. outer periphery of the bracket (4)). Further, the ratchet arm (16) is biased counterclockwise as seen in FIG. 3 by means of a spring (17) which extends between a pin (18) and a hook portion (16c) on the arm (16).

A hydraulic cylinder (19) is provided on the bracket (4) and has a piston (20) axially slidably received therein. The piston (20) has a piston rod (21) which is in abutting engagement with a radial extension (22) of the block (9). The reference numeral (23) shows a stop for counterclockwise rotation of the block (9).

Figure 3:
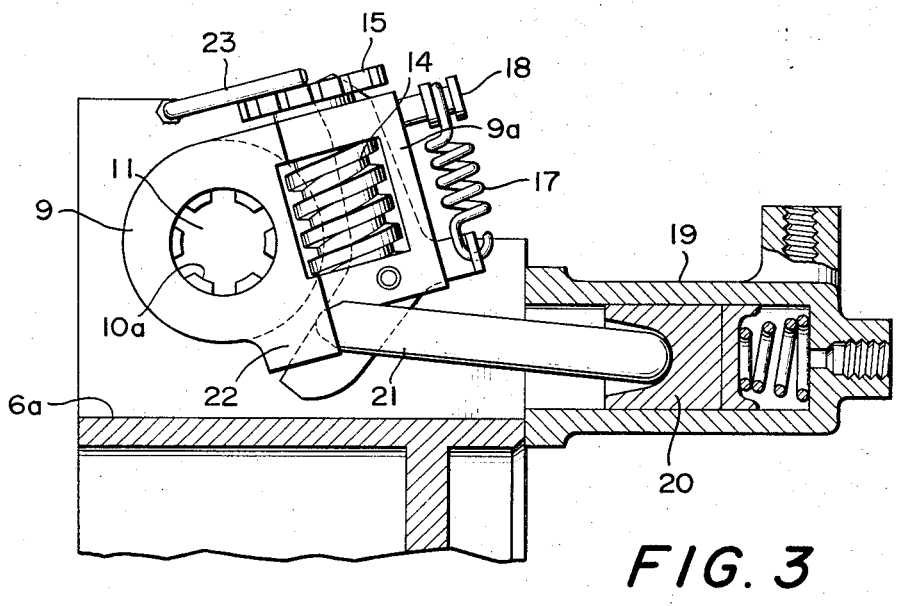
FIG. 3 is a sectional view taken along the line III—III of FIG. 1.
Figure 4:
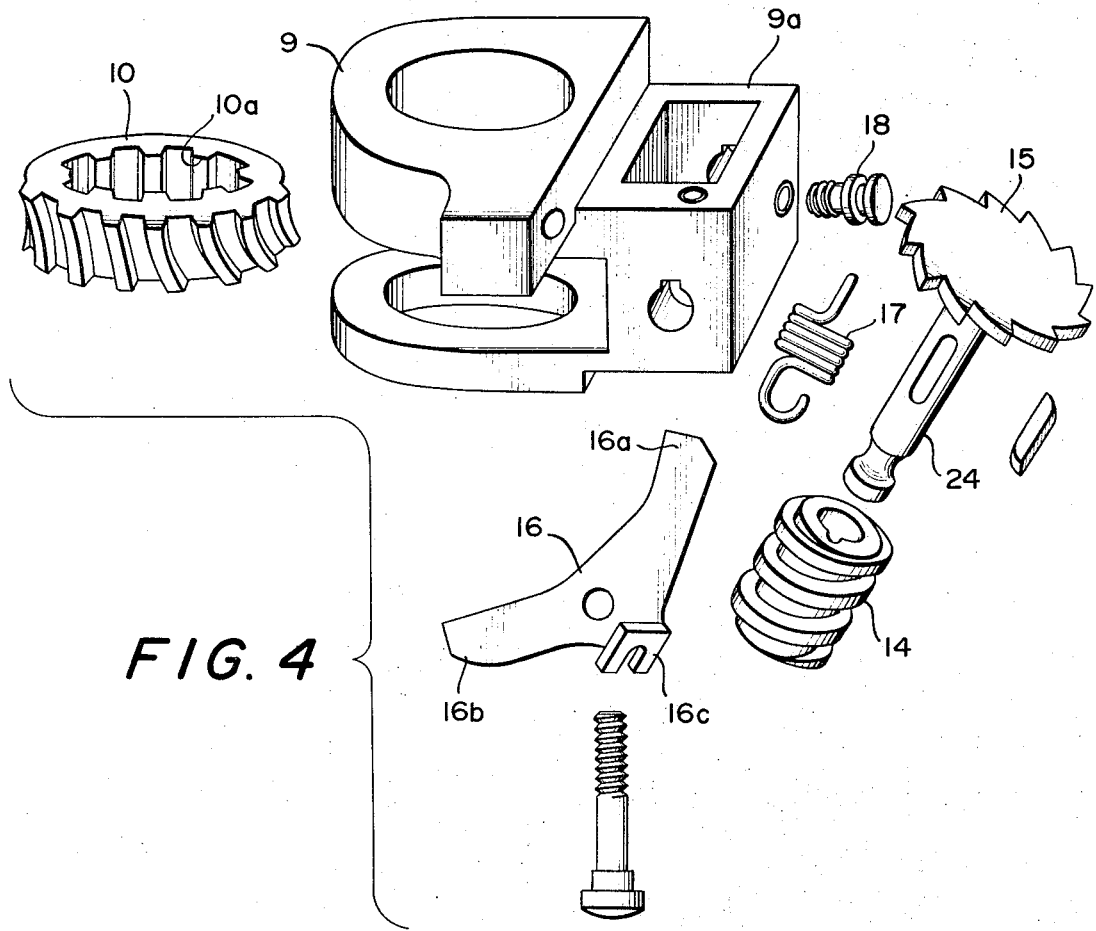
FIG. 4 is an exploded view of the brake clearance adjusting mechanism used in the device shown in FIG. 1.
Figure 5:
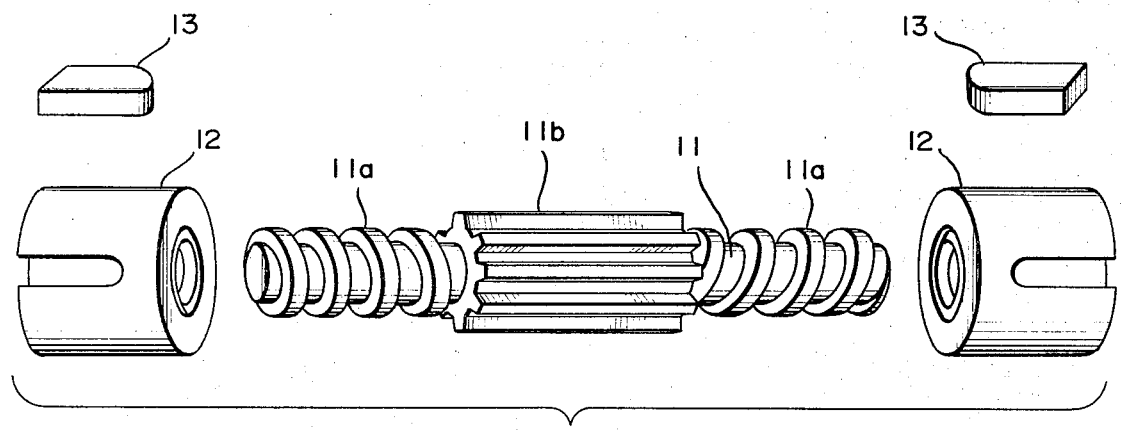
FIG. 5 is an exploded view of the screw and nut mechanism.
Figure 6:
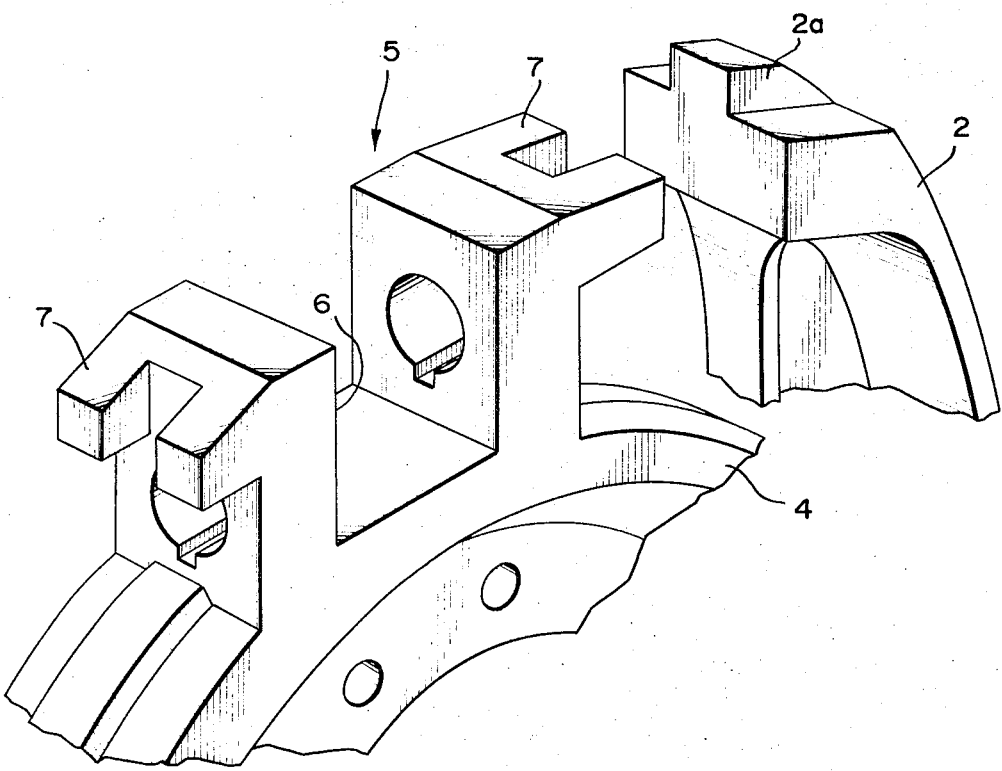
FIG. 6 is a fragmentary perspective view of a brake shoe and its support bracket.

In operation of the device as constructed above, the piston (20) in the cylinder (19) is hydraulically shifted leftwardly as seen in FIG. 3. Thus, the block (9) is rotated clockwise and the rotation of the block (9) is then transmitted through the worm (14) and the worm wheel (10) to the screw rod (11). The rotation of the screw rod (11) causes axial outward movement of the nuts (12) which then urge the brake shoes (2) into engagement with the friction surface (1a) of the brake drum (1). Since the screw rod (11) is axially slidably received in the worm wheel (10), the pair of nuts (12) can apply equal pressure to the brake shoes (2). When the brake pressure is released, the springs (8) urges the shoes (2) radially inwardly. Thus, the nuts (12) are also urged toward the returning direction. The pitch of the screw thread (11a) is so determined that when the nuts (12) are urged as described above the screw rod (11) is rotated toward the initial position.

When the brake lining (3) on the brake shoe (2) is worn, the stroke of the piston (20) is correspondingly increased. Thus, when the brake lining (3) is worn beyond a predetermined amount, the end (16b) of the ratchet arm (16) comes into abutting engagement with the bottom (6a) of the cutout (6). Further rotation of the block (9) causes a relative rotation of the ratchet arm with respect to the block (9), thus disengaging the end (16a) of the arm (16) from the ratchet wheel (15).

When the brake is released, the end (16a) of the ratchet arm (16) re-engages with the ratchet wheel (15) at a circumferentially advanced position. Since the spring (17) serves to restore the initial relative position between the ratchet arm (16) and the block (9), the returning movement of the arm (16) causes a rotation of the ratchet wheel (15). Thus, the worm (14) is rotated to drive the worm wheel (10) relative to the block (9). Therefore, the screw rod (11) is caused to rotate by an amount corresponding to the amount of wear of the brake lining (3), whereby the position of the brake shoe (2) is automatically adjusted to maintain a suitable clearance between the lining (3) and the friction surface (1a) of the brake drum (1).

Figure 7:
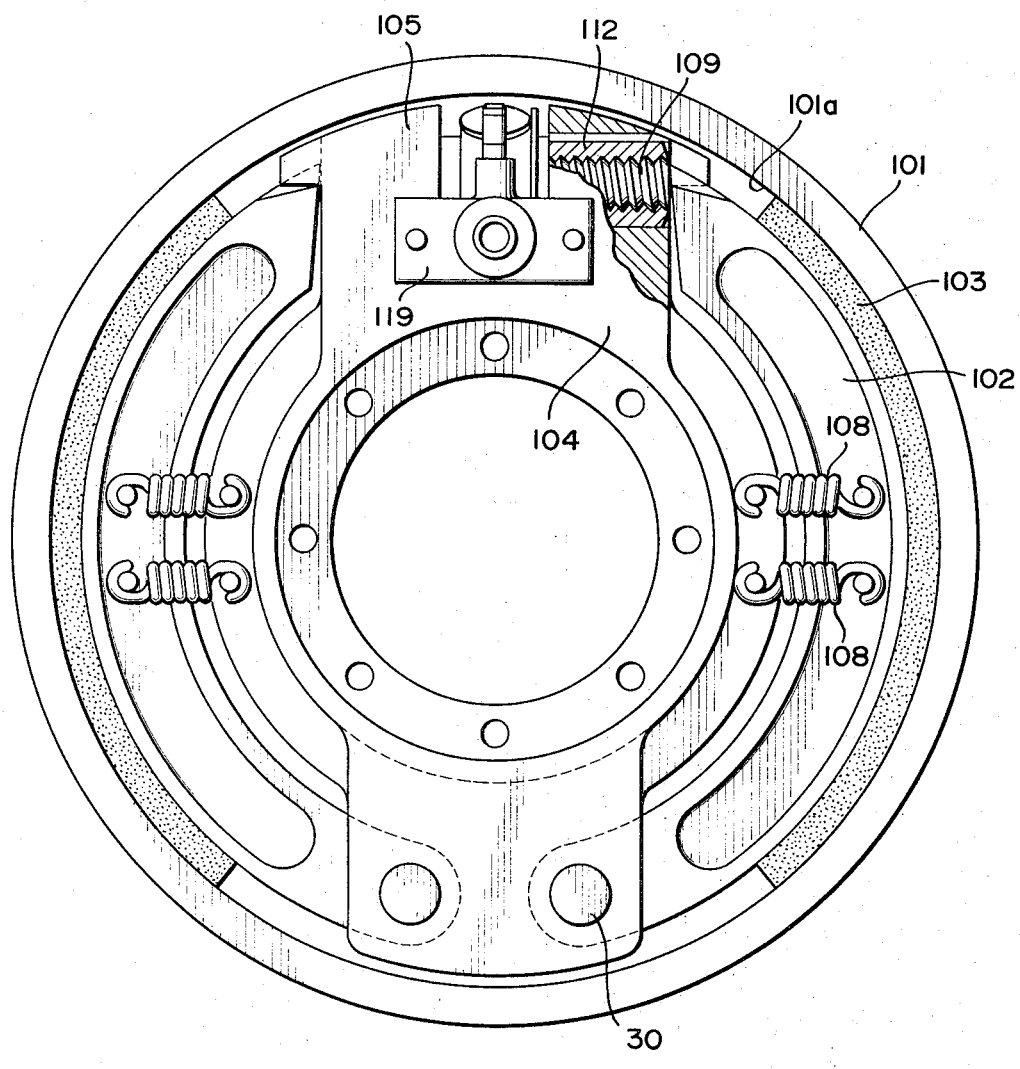
FIG. 7 is a front view of another embodiment of the present invention.

FIG. 7 shows another brake device to be provided with the automatic clearance adjusting mechanism of the present invention in which the corresponding parts are designated by the same reference numeral with the addition of 100. This embodiment is different from the previous embodiment in that each brake shoe (102) is pivotally mounted at one end on the stationary bracket (104) and combined with a brake actuating mechanism at the other end. The brake actuating mechanism is similar to that employed in the previous embodiment and comprises a screw rod (109) engaging with a pair of nuts (112) at its opposite ends. The screw rod (109) is rotated by a hydraulic or pneumatic cylinder (119) through a quite similar mechanism as in the previous embodiment.

The arrangement of the present invention provides a further advantage in that, since the actuator cylinder (19) or (119) is completely exposed to atmosphere, any adverse temperature rise of the cylinder can be effectively prevented. As an alternative arrangement, the block (9) may be provided with a radially projecting arm which may be connected to a manual actuating mechanism such as a cable or a linkage, so as to provide an emergency or parking brake.

The invention has thus been shown and described with reference to specific embodiments which are believed to be preferred ones, however, it should be noted that the invention is in no way limited to the details of the illustrated structure, but many changes and modifications may be made without departing from the scope of the appended claims.

I claim:

1. A brake device comprising a stationary bracket having bracket arms and carrying brake shoes, a screw rod engaged in nuts disposed slidably in bores formed in said arms and positioned to actuate said brake shoes, a block having bores through which said screw rod is mounted rotatably and provided with a worm housing, said block being disposed between said arms, a worm wheel mounted on said screw rod in said block, a shaft supported rotatably by said worm housing and disposed at about a right angle to the axis of said screw rod, a worm gear mounted on said shaft within the worm housing and engaging with said worm wheel, a ratchet wheel secured to the end of said shaft adjacent said worm housing, a ratchet arm having one end engageable with said ratchet wheel to rotate said worm gear, a spring means disposed between said worm housing and said ratchet arm to urge said one end of the ratchet arm against the teeth of said ratchet wheel so that the other end of said ratchet arm is positioned normally apart from the outer surface of said stationary bracket, and a hydraulic means including a piston rod for actuating said block.

* * * * *